Figure 1:
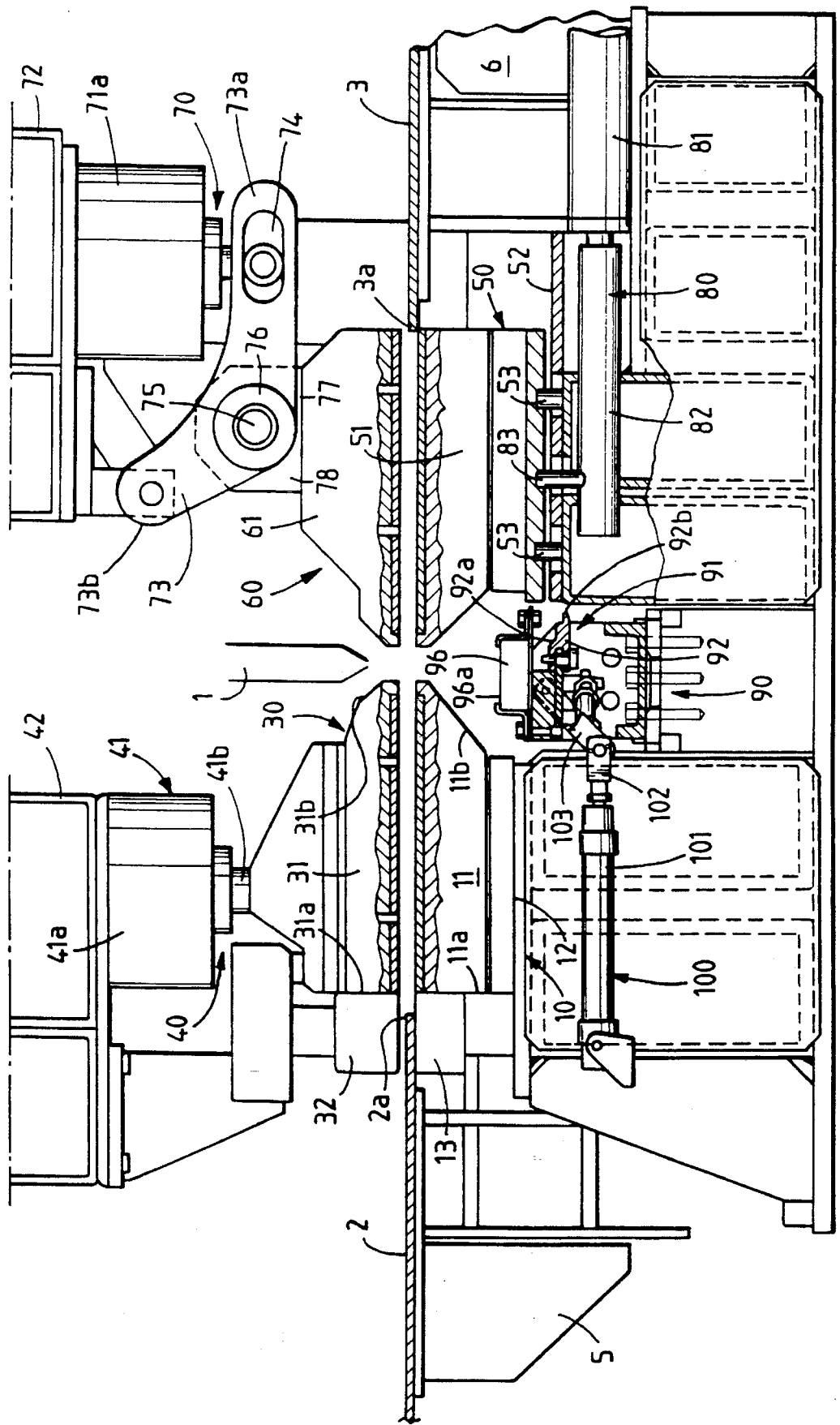

United States Patent [19]

Peru et al.

[11] Patent Number: 5,536,915
[45] Date of Patent: Jul. 16, 1996

[54] DEVICE FOR PUTTING AT LEAST TWO SHEET BLANKS IN REGISTER EDGE TO EDGE IN A PLANT FOR WELDING BY MEANS OF A BEAM HAVING A HIGH ENERGY DENSITY

[75] Inventors: Gilles Peru, Dunkerque; Yvon Le Roy, Le Doulieu; Charles Sion, Camphin-en-Carembault; Emmanuel Metsue, Grande-Synthe; Gabriel Vergniez, Boisdinghem, all of France

[73] Assignee: Sollac, Puteaux, France

[21] Appl. No.: 368,663

[22] Filed: Jan. 4, 1995

[30] Foreign Application Priority Data

Jan. 20, 1994 [FR] France .................. 94 00597

[51] Int. Cl.$^6$ .................. B23K 26/02; B23K 37/04
[52] U.S. Cl. .................. 219/121.63; 219/121.67; 219/121.82; 228/49.4
[58] Field of Search .................. 219/121.63, 121.64, 219/121.67, 121.72, 121.82, 101, 102, 103, 104; 228/5.7, 49.1, 49.4; 198/463.4, 400; 414/19; 83/468.5, 468.6

[56] References Cited

U.S. PATENT DOCUMENTS

| | | | |
|---|---|---|---|
| 3,694,613 | 9/1972 | Ballard et al. | 219/101 |
| 4,506,821 | 3/1985 | Bernou et al. | 228/5.7 |
| 5,169,051 | 12/1992 | Noe | 228/5.7 |
| 5,266,770 | 11/1993 | Noe | 219/121.63 |
| 5,276,304 | 1/1994 | Sauvage et al. . | |
| 5,328,083 | 7/1994 | Peru et al. . | |
| 5,364,006 | 11/1994 | Peru et al. . | |
| 5,375,496 | 12/1994 | Peru et al. . | |

FOREIGN PATENT DOCUMENTS

| | | |
|---|---|---|
| 0482223A1 | 4/1992 | European Pat. Off. . |
| 0494345A1 | 7/1992 | European Pat. Off. . |

OTHER PUBLICATIONS

U.S. Ser. No. 08/368,663 filed Jan. 4, 1995, pending.
U.S. Ser. No. 08/546,359 filed Oct. 20, 1995, pending.

*Primary Examiner*—Teresa J. Walberg
*Assistant Examiner*—J. Pelham
*Attorney, Agent, or Firm*—Oblon, Spivak, McClelland, Maier & Neustadt

[57] ABSTRACT

The invention provides a device for putting et least two sheet blanks (2 and 3) in register edge to edge in a plant for welding these sheet blanks by means of a high energy density beam (1). The device comprises a longitudinal stop element (92) movable, on one hand, by the action of a first control means (100), between a retracted horizontal first position and a retracted vertical intermediate second position and, on the other hand, by the action of a second control means (110), between said intermediate second position and a vertical third position for putting in register the first sheet blank (2), in which position a lower part of the stop element (92) is gripped between the means for positioning and clamping the sheet blanks and an upper end part of the stop element (92) extends above a horizontal reference plane for positioning the edge to be welded (2a) of the first sheet blank (2) on the axis of the high energy density beam (1).

12 Claims, 4 Drawing Sheets

DEVICE FOR PUTTING AT LEAST TWO SHEET BLANKS IN REGISTER EDGE TO EDGE IN A PLANT FOR WELDING BY MEANS OF A BEAM HAVING A HIGH ENERGY DENSITY

The present invention relates to a device for putting at least two sheet blanks in register edge to edge in a plant for welding these sheet blanks by means of a beam having a high energy density.

The welding of at least two sheet blanks by means of a beam having a high energy density has considerably developed industrially, in particular in the production of butt-welded parts, for example for the automobile industry.

Indeed, the butt-joined sheet blanks, i.e. sheet blanks assembled edge to edge without overlapping and welded by means of a beam having a high energy density, fully retain their capability of being press formed.

The sheet blanks may be of different geometrical shapes and/or different thicknesses, and may even be of different grades of steel.

To achieve a correct butt welding of two sheet blanks by means of a beam having a high energy density so that the press forming capability of the welded sheet blanks remains optimum, the sheet blanks to be welded must be disposed with their edges placed against each other without gaps and, in the case of sheet blanks of different shapes, their longitudinal positioning relative to each other must be perfect.

Further, it is essential to ensure, on one hand, a perfect lateral positioning of the sheet blanks so that the joint plane of the two sheet blanks is located on the axis of the high energy density beam and, on the other hand, a maintenance of the longitudinal and lateral registering of said sheet blanks in order to keep the joint plane on the axis of the high energy density beam.

Moreover, the requirements for the butt welding of at least two sheet blanks by means of a high energy density beam are very stringent as to the precision, the shape and the position of the sheet blanks to be welded.

Indeed, the quality of the joint to be welded partly depends on the precision in the positioning of the sheet blanks and in the quality of the contact in the region of the joint plane between the sheet blanks.

If the quality of contact in the region of the joint plane is insufficient, i.e. if the clearance is excessive, the welded joint exhibits collapsed parts and even gaps, since the welded joint is not continuous in this case.

To ensure a minimum clearance in the region of the joint plane of the sheet blanks so as to obtain a good welded joint quality, the quality of the shearing of the sheets can be improved so as to limit the undulations of the edges of the shear and improve the contact between the sheet blanks and in this way better control this clearance between the sheet blanks.

But, to obtain such a result, it is necessary to invest in expensive very precise shears or use double shears whereby it is possible to shear with the same blade the two sheets to be simultaneously butt joined.

A lateral pressure can also be exerted on the sheet blanks in the direction toward the joint plane of the sheet blanks so as to crush the crests of the undulations of the sheared edges to be welded.

The last solution is increasingly adopted in industrial plants welding by means of a high energy density beam.

For this purpose there are known industrial plants, termed dynamic plants, which permit receiving the sheet blanks, positioning said sheet blanks relative to each other and relative to the axis of the high energy density beam during their displacement in the direction of said beam, and then permit maintaining this relative positioning of the sheet blanks during their displacement, welding the sheet blanks and discharging the latter.

Industrial plants are also known, termed static plants, in which the sheet blanks positioned edge to edge are fixed and the welding unit is movable along the plane of the joint to be welded of these sheet blanks.

Generally, these static plants comprise means for positioning relative to a horizontal reference plane and clamping the first sheet blank, and means for positioning relative to said horizontal reference plane and clamping the second sheet blank.

These positioning and clamping means are most often formed by clamping jaws which grip the sheet blanks as close as possible to the joint to be welded, i.e. at a few millimeters from this joint.

The space between the clamping jaws on each side of the joint to be welded is therefore very small.

For the purpose of putting the edges to be welded of the sheet blank in register, pins or lugs are used in this static type of plant.

The lugs or pins become deformed by the repeated contacts of the sheet blanks which abut these lugs or pins when putting the sheets in register.

Further, these pins or lugs are often placed in the zone passed through by the high energy density beam and are very rapidly deteriorated by this beam, even if they are located at a distance under the welded joint which should normally protect them from the power of the high energy density beam.

The deterioration of these pins or lugs comes from the projections of incandescent slag owing in particular to the blowing of the welding gases.

An object of the invention is to avoid these drawbacks by providing a device for putting at least two sheet blanks in register edge to edge in a plant for welding these sheet blanks by means of a high energy density beam, which affords the feature of permitting high precision in the putting of the sheets in register notwithstanding the considerable and repeated forces of contact.

The invention therefore provides a device for putting at least two sheet blanks in register edge to edge in a plant for welding said sheet blanks by means of a high energy density beam, of the type comprising:

means for positioning in a horizontal reference plane and clamping the first sheet blank, means for positioning in said horizontal reference plane and clamping the second sheet blank, which are movable in a direction perpendicular to the joint plane of the sheet blanks, and a welding unit comprising a high energy density beam, characterized in that it comprises a longitudinal stop element located below and between the means for positioning and clamping the sheet blank and movable, on one hand, by the action of a first control means, between a retracted horizontal first position and a retracted vertical intermediate second position and, on the other hand, by the action of a second control means, between said intermediate second position and a vertical third position for putting the first sheet blank in register in which position the lower part of said stop element is gripped between said means for positioning and clamping the sheet blanks and the upper end part of said stop element extends above the horizontal reference plane for the positioning of the edge to be welded of the first sheet blank on the axis of the high energy density beam.

According to other features of the invention:

the stop element is formed by a ruler whose length is substantially equal to the length of the edges to be welded of the sheet blanks and connected to a support by connecting links articulated at each of their ends, on one hand, to the ruler and, on the other hand, to the support, the support is formed by a longitudinal bar extending below the ruler and mounted at each end on a frame by means of a horizontal trunnion parallel to the joint plane of the edges to be welded of the sheet blanks, said bar being movable under the action of the first control means between a horizontal first position and a vertical second position, the first control means comprises at least one double acting cylinder device having a piston rod connected by a link to one of said horizontal trunnions, the lateral face of the lower part of the stop element adapted to cooperate with the means for positioning the first sheet blank has a section matching the section of said positioning means, the second control means comprises at least one double acting cylinder device comprising a body pivotally mounted on the support and a piston rod having a free end pivotally mounted on one of the connecting links at a point located in proximity to the articulation between said connecting link and said ruler, the device comprises means for protecting the stop element mounted on the face of the support which is disposed in confronting relation to the high energy density beam in the retracted horizontal first position of the stop element, the means for protecting the stop element comprise brick sections of refractory material, the width of the bricks of refractory material exceeds the width of the high energy density beam reflected on said bricks in the absence of sheet blanks in the positioning and clamping means, said beam being focused onto the sheet blanks under the welding conditions, the width of the bricks of refractory material is between 50 and 70 mm, the upper face of the bricks of refractory material is machined in the shape of a basin.

the brick sections of refractory material extend over a length which is at least equal to the length of the stop element.

Figure 2:
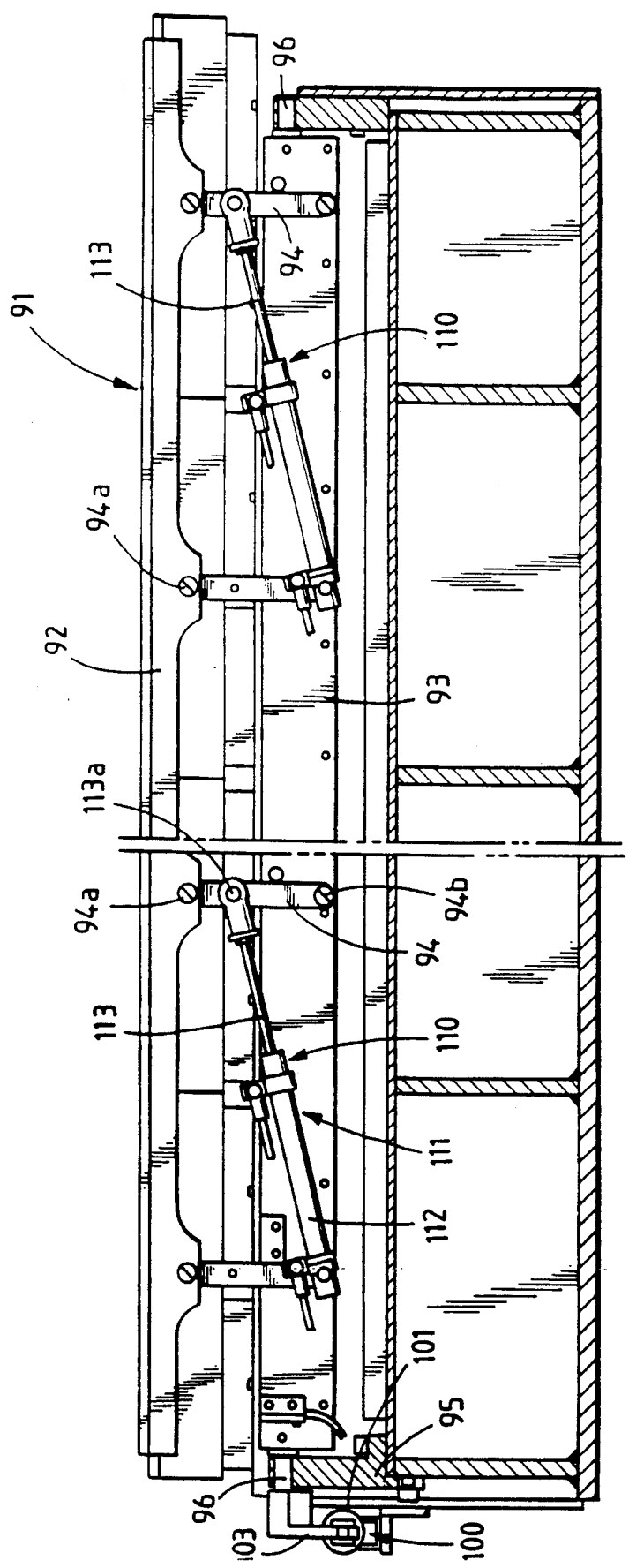
Figure 3:
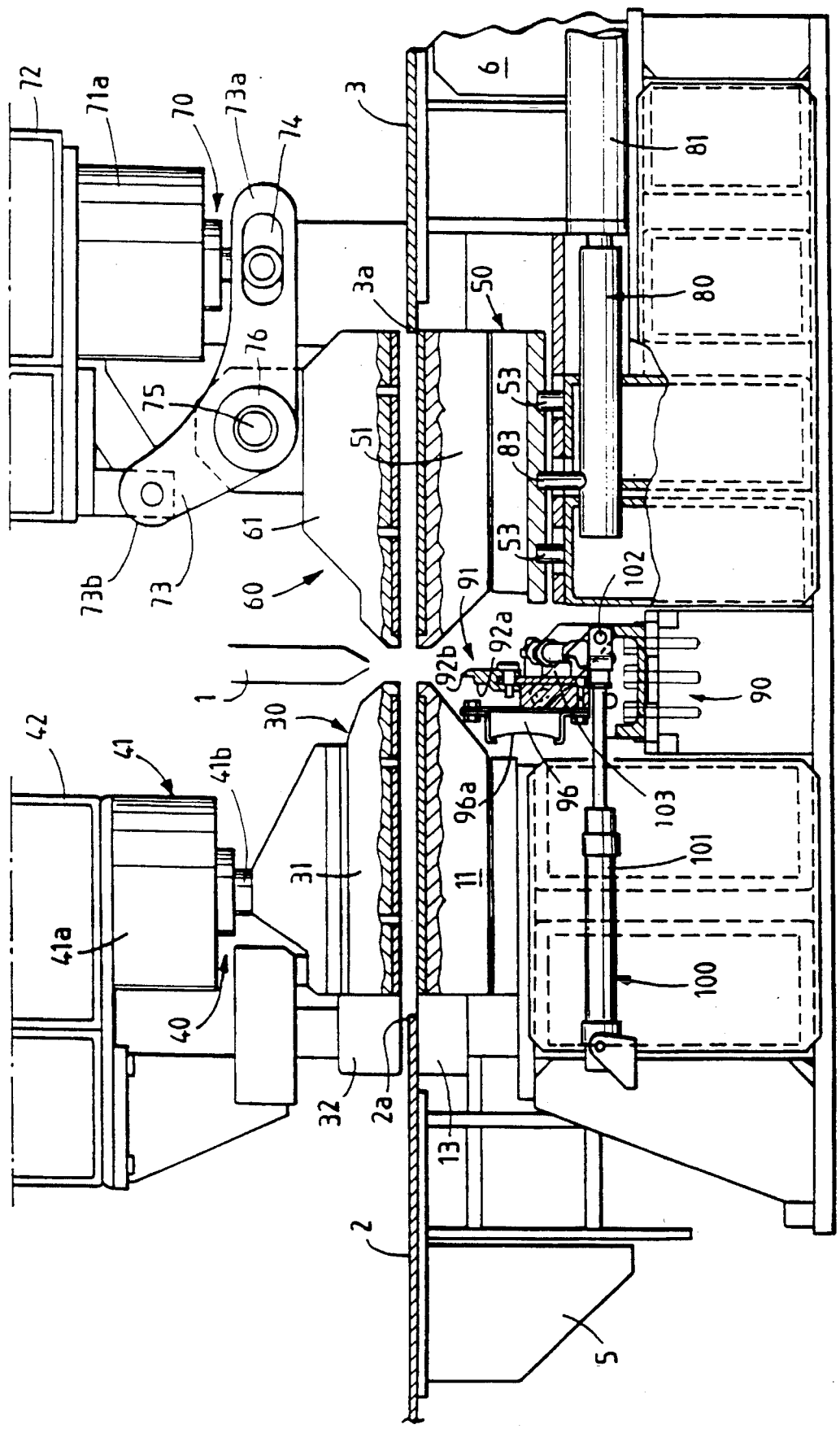
Figure 4:
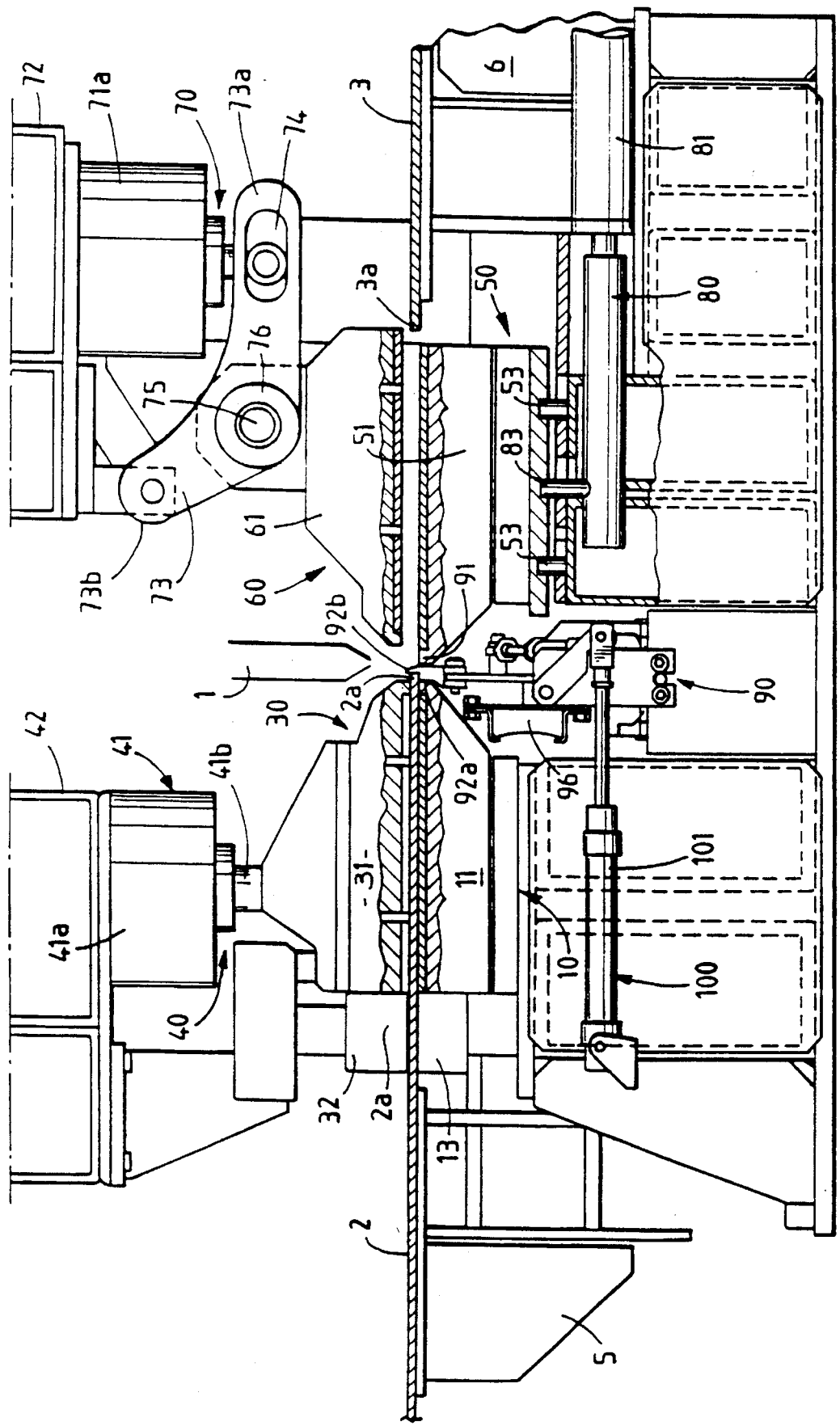

Features and advantages of the invention will be apparent from the following description which is given solely by way of example with reference to the accompanying drawings, in which:

FIG. 1 is a diagrammatic cross-sectional view of a plant for welding at least two sheet blanks provided with a device for putting the sheet blanks in register according to the invention, in the retracted position, FIG. 2 is a diagrammatic side elevational view of the device for putting the sheet blanks in register according to the invention, in the active position, FIGS. 3 and 4 are diagrammatic cross-sectional views of a welding plant, showing the different positions of the device for putting the sheet blanks in register according to the invention.

The plant shown diagrammatically in the Figures is adapted to position edge to edge and weld by means of a beam 1 having a high energy density, such as for example a laser beam, at least two sheet metal blanks 2 and 3 which may be of different geometrical and/or different thicknesses, and even different grades of steel, for example for the automobile industry.

In the embodiment described hereinafter, the plant is adapted to position edge to edge and weld the two sheet blanks 2 and 3, the edge to be welded 3a of the sheet blank 3 being applied against the edge to be welded 2a of the sheet blank 2.

For this purpose, the plant shown diagrammatically in the Figures comprises:

a lateral table 5 for supporting the sheet blank 2, a lateral table 6 for supporting the sheet blank 3, means 10 for positioning the sheet blank 2 in a horizontal reference plane, means 30 for maintaining the edge to be welded 2a of the sheet blank 2 on the axis of the laser beam 1, means 40 for clamping the sheet blank 2, means 50 for supporting and positioning the sheet blank 3 in said horizontal reference plane, means 60 for maintaining the edge to be welded 3a of the sheet blank 3 against the edge to be welded 2a of the sheet blank 2, means 70 for clamping the sheet blank 3, means 80 for exerting a lateral pressure on the edges to be welded 2a and 3a of the sheet blanks 2 and 3, a device 90 for putting the edge to be welded 2a of the first sheet blank in register on the axis of the laser beam 1, and a welding unit employing the laser beam 1.

The means 10 for positioning the first sheet blank 2 comprise at least one fixed lower shoe 11 resting on a support table 12 and extending in a direction parallel to the joint plane of the sheet blanks 2 and 3.

This lower shoe 11 forms a continuous surface of contact with the lower face of the sheet blank 2.

The lower shoe 11 bears by its lateral face 11a, remote from the face 11b in confronting relation to the joint plane of the sheet blanks 2 and 3, against at least one stop 13 mounted on the support table 12 and constituted for example by rollers.

This stop 13 prevents the sliding of the lower shoe 11 in a direction perpendicular to the joint plane of the sheet blanks 2 and 3 when a lateral pressure is exerted on said sheet blanks 2 and 3, as will be subsequently understood.

The means 30 for maintaining the edge to be welded 2a of the sheet blank 2 on the axis of the laser beam 1 comprise at least one vertically movable upper shoe 31 extending in a direction parallel to the joint plane of the sheet blanks 2 and 3.

This upper shoe 31 constitutes a continuous surface of contact with the upper face of the sheet blank 2 and is disposed in facing relation to the lower shoe 11.

The lower shoe 11 and the upper shoe 31 may be replaced by a plurality of juxtaposed shoes forming substantially continuous surfaces of contact with the sheet blank 2.

The means 40 for clamping the first sheet blank 2 comprise at least one cylinder device 41 which exerts on the upper shoe 31 a vertical pressure for clamping the sheet blank 2 between the upper shoe 31 and the lower shoe 11.

The cylinder device 41 comprises a body 41a, carried by a beam 42 extending in a direction parallel to the upper shoe 31, and a vertically movable rod 41b connected to the upper shoe 31.

The upper shoe 31 bears, by its lateral face 31a remote from the lateral face 31b in confronting relation to the joint plane of the sheet blanks 2 and 3, against at least one stop 32 connected to the beam 42 and constituted for example by rollers.

This stop 32 prevents the sliding of the upper shoe 31 when a lateral pressure is exerted on the sheet blanks 2 and 3.

The unit formed by the beam 42, the cylinder device 41, the upper shoe 31 and the stop 32 may be mounted to be vertically movable or pivotable so as to permit the positioning of the sheet blank 2 on the lower shoe 11.

The means 50 for positioning the sheet blank 3 comprise at least one lower shoe 51 forming a substantially continuous surface of contact with the lower face of the sheet blank 3.

This lower shoe 51 extends in a direction parallel to the sheet blanks 2 and 3.

Further, the lower shoe 51 is mounted to be movable on a support table 52 in a direction perpendicular to the joint plane of the sheet blanks 2 and 3.

For this purpose, the lower shoe 51 comprises two pins 52 projecting from its lower face.

Each pin 52 extends into an opening 54 provided in the support table 52 so as to guide the lower shoe 51 upon its transverse movement relative to the joint plane of the sheet blanks 2 and 3.

The means 60 for maintaining the edge to be welded 3a of the sheet blank 3 against the edge to be welded 2a of the sheet blank 2 comprise at least one upper shoe 61 forming a substantially continuous surface of contact with the upper face of the sheet blank 3.

This upper shoe 61 extends in a direction parallel to the joint plane of the sheet blanks 2 and 3 and is disposed in facing relation to the lower shoe 51.

The upper shoe 61 is movable, on one hand, vertically and, on the other hand, in a direction perpendicular to the joint plane of the sheet blanks 2 and 3.

The means 70 for clamping the sheet blank 3 comprise at least one cylinder device 71 associated with the upper shoe 61.

The cylinder device 71 is adapted to exert on the upper shoe 61 a vertical pressure which is such as to clamp the sheet blank 3 between the upper shoe 61 and the lower shoe 51.

Each cylinder device 71 comprises a body 71a carried by a beam 72 extending in a direction parallel to the upper shoe 61 and a vertically movable rod 71b connected to the upper shoe 61 by connecting means comprising a V-shaped strut 73.

This strut 73 comprises a first end portion 73a, pivotally mounted on the free end portion of the rod 71b of the cylinder device 71 by means of an oblong aperture 74 provided in said strut, and a second end portion 73b pivotally mounted on the beam 72 carrying the cylinder device 71.

The strut 73 further comprises a pivot pin 75 located between the end portions 73a and 73b of the strut 73 and provided with a roller 76 disposed in an opening 77 in a fork 78 connected to the upper shoe 61.

The unit constituted by the beam 72, the cylinder device 71, the strut 73, and the upper shoe 61, is mounted to be raisable or pivotable for the purpose of raising the upper shoe 61 and positioning the sheet blank 3 on the lower shoe 51.

The means 80 for exerting a lateral pressure on the edges to be welded 2a and 3a of the sheet blanks 2 and 3 comprise at least one cylinder device 81 associated with the lower shoe 51.

The cylinder device 81 is adapted to exert on the lower shoe 51 a given pressure in a direction perpendicular to the joint plane of the sheet blanks 2 and 3.

The cylinder device 81 comprises a rod 82 movable horizontally and connected to the lower shoe 51 by at least one pin 83 which extends through the support table 52.

The sheet blank registering device 90 according to the invention comprises a longitudinal stop element generally designated by the reference numeral 91.

The longitudinal stop element 91 is located below the lower shoes 11 and 51 and the means for positioning and clamping the sheet blanks 2 and 3.

The stop element 91 comprises a ruler or strip 92 whose length is substantially equal to the length of the edges to be welded 2a and 3a of the sheet blanks 2 and 3.

The ruler 92 is connected to a support 93 by connecting links 94 (FIG. 2).

The connecting links 94 are articulated by one end 94a to the ruler 92 and by the other end 94 to the support 93.

This support 93 comprises a longitudinal bar extending below the ruler 92 and pivotally mounted at each end on a frame 95 by a horizontal trunnion 96 parallel to the joint plane of the edges to be welded 2a and 3a of the sheet blanks 2 and 3.

The ruler 92 is movable, on one hand, by the action of a first control means 100, between a retracted horizontal first position (FIG. 1) and a retracted vertical intermediate second position (FIG. 3) and, on the other hand, by the action of a second control means 110, between said intermediate second position and a vertical third position (FIG. 4) for putting the edge to be welded 2a of the first sheet blank 2 in register with the axis of the laser beam 1.

Further, the bar 93 is also movable by the action of the first control means 100 between a horizontal first position and a vertical second position.

The first control means 100 comprises at least one double acting cylinder device 101 whose piston rod 102 is connected to one of the horizontal trunnions 96 by a link 103.

The second control means 110 comprises a plurality of double acting cylinder devices 111, as shown in FIG. 2.

Each cylinder device 111 comprises, on one hand, a body 112 pivotally mounted on the support 93 and preferably on the articulation 94b connecting a connecting link 94 to said support 93 and, on the other hand, a piston rod 113 whose free end 113a is pivotally mounted on the adjacent connecting link 94 at a point located in proximity to the articulation 94a between the link 94 and the ruler 92.

The lateral face of the lower part 92a of the ruler 92 which is adapted to cooperate with the lower shoe 11 when the ruler 92 is in a position in register with the edge to be welded 2a of the first sheet blank 2, has a section matching the section of the edge of the lower shoe 11.

Further, the sheet blank registering device 90 further comprises means for protecting the ruler 92 and the support 93, during the welding of the edges 2a and 3a of the sheet blanks 2, against projection of incandescent slag onto the ruler 92.

These protecting means are formed by brick sections 96 of refractory material mounted on the face of the support 93 in facing relation to the laser beam 1 in the retracted horizontal first position of the ruler 92 (FIG. 1).

The width of the bricks 96 of refractory material exceeds the width of the laser beam 1 reflected on said bricks 96 in the absence of sheet blanks 2 and 3 between the shoes 11, 31 and 51, 61, said laser beam 1 being focused onto the sheet blanks 2 and 3 under the welding conditions.

The brick sections 96 of refractory material extend over a length which is at least equal to the length of the ruler 92.

The width of the bricks 96 of refractory material is between 50 and 70 mm and the upper face 96a of the bricks 96 is machined in the shape of a basin for recovering the incandescent slag.

The plant operates in the following manner.

The lower shoe 11 is fixed at a known constant and precise distance from the axis of the laser beam 1.

First of all, the ruler 92 is in a retracted horizontal position as shown in FIG. 1, and the first stage consists in returning the ruler 92 to a vertical position.

For this purpose, the shoes 51 and 61 are retracted, as shown in FIG. 1.

Putting under pressure the cylinder device 101 which acts on the link 103 and on the horizontal trunnion 96, causes the pivoting of the unit comprising the support 93, the connecting links 94 and the ruler 92 to the retracted vertical intermediate position, as shown in FIG. 3.

The following step consists in bringing the ruler 92 between the lower shoes 11 and 51.

To this end, the cylinder devices 111 are put under pressure so that the piston rods 113 of these cylinder devices 111 cause, through the medium of the connecting links 94, the pivoting of the ruler 92 with respect to the support 93 in such manner as to bring the ruler 92 to its vertical position for putting the edge to be welded 2a of the first sheet blank 2 in register.

In this position, shown in FIG. 4, the displacement of the lower shoe 51 by the action of the cylinder device 81 causes the ruler 92 to be gripped between the lower shoe 11 and the upper shoe 51.

The lower part 92a of the ruler 92 is therefore gripped between the lower shoes 11 and 51 and the upper end part 92b of the ruler 92 extends above the horizontal reference plane defined by the lower shoes 11 and 51.

With the ruler 92 thus in register, the first sheet blank 2 is introduced between the lower shoe 11 and the upper shoe 31 in such manner that its edge to be welded 2a comes to be applied against the upper end part 92b of the ruler 92.

Thereafter, the first sheet blank 2 is clamped between the lower shoe 11 and the upper shoe 31 by means of the cylinder device 41.

As soon as the first sheet blank 1 is clamped in position, the grip on the ruler 92 is laterally released by the retraction of the lower shoe 51 by the action of the cylinder device 81.

The ungripping of the ruler 92 permits moving the latter downwardly by means of the cylinder devices 111 and the connecting links 94, then pivoting the ruler 92 and the support 93 by means of the cylinder device 101 to the retracted horizontal position.

The space thus cleared between the shoes allows the introduction of the second sheet blank 3 to a position opposite to the first sheet blank 2 which has already been put in register.

After bringing the second sheet blank 3 against the edge 2a of the first sheet blank 2, the second sheet blank 3 is clamped by lowering the upper shoe 61 and putting the cylinder device 71 under pressure.

The descent of the rod 71b of the cylinder device 71 causes the strut 73 to pivot about its opposite end portion 73b so that the roller 67 comes to be applied against the upper face of the upper shoe 61.

Thus the roller 76 exerts, by the action of the cylinder device 71 and the strut 73, a pressure on the upper shoe 61 which is such as to clamp the sheet blank 3 between the shoes 51 and 61 and maintain the edge to be welded 3a of the sheet blank 3 against the edge to be welded 2a of the sheet blank 2, i.e. on the axis of the laser beam 1.

The strut 73 amplifies by a leverage effect the pressure exerted on the sheet blank 3 by the upper shoe 61.

This configuration produces a pressure-applying force having a vertical component and a tangential component produced by the vertical force and the frictional adherence, which puts the sheet blanks 2 and 3 to be butt joined under a lateral pressure.

To ensure a minimum of clearance between the edges to be welded 2a and 3a of the sheet blanks 2 and 3, the rod 82 acts, when the cylinder device 81 is put under pressure, through the medium of the pin 83, on the lower shoe 51 which is displaced in a direction perpendicular to the joint plane of the sheet blanks 2 and 3 and exerts a lateral pressure on the edges to be welded 2a and 3a.

The lateral displacement of the lower shoe 11 and the upper shoe 31 is prevented by the stop elements 13 and 32 respectively.

Thereafter, the edges 2a and 3a are welded by the laser beam 1.

During the welding of the edges 2a and 3a of the sheet blanks 2 and 3, the ruler 92 and the support 93 are protected by the bricks 96 of refractory material.

The sheet blank registering device according to the invention has the advantage of being simple and compact and may be mounted on static cycle welding plants in which the high energy density beam is moved over the sheet blanks to be welded, or on dynamic cycle welding plants in which the sheet blanks to be welded are moved under the high energy density beam.

The sheet blank registering device according to the invention affords high precision in the positioning of the joint to be welded and the precision and the rigidity are provided by all of the existing surrounding parts employed for other functions.

Further, the device is easy to service and provides an integrated protection against impacts of the high energy density beam.

What is claimed is:

1. Device for putting at least a first sheet blank and a second sheet blank in register edge to edge in a joint plane in a plant for welding said sheet blanks by means of a high energy density beam, said device comprising in combination:

means for positioning and clamping said first sheet blank in a horizontal reference plane, means for positioning and clamping said second sheet blank in said horizontal reference plane and movable in a direction perpendicular to said joint plane, and a welding unit comprising a high energy density beam, said device further comprising in combination:

a longitudinal stop element located below and between said means for positioning and clamping said sheet blanks, a first control means for moving said stop element between a retracted substantially horizontal first position and a retracted vertical intermediate second position, a second control means for moving said stop element between said intermediate second position and a vertical third position for putting said first sheet blank in register, in which third position a lower part of said stop element is gripped between said means for positioning and clamping said sheet blanks, and an upper end part of said stop element extends above said horizontal reference plane for positioning said edge to be welded of said first sheet blank on the axis of said high energy density beam.

2. Device according to claim 1, comprising a support, said stop element comprising a ruler having a length substantially equal to the length of said edges to be welded of said sheet blanks, and connecting links connecting said ruler to said support, said connecting links being each articulated at ends thereof to said ruler and to said support respectively.

3. Device according to claim 2, comprising a frame, said support comprising a longitudinal bar extending below said ruler, a horizontal trunnion parallel to said joint plane and pivotally mounting each end of said bar on said frame, said bar being movable, by the action of said first control means, between a substantially horizontal first position and a vertical second position.

4. Device according to claim 3, wherein said first control means comprises at least one double acting cylinder device having a piston rod and a link connecting said piston rod to one of said horizontal trunnions.

5. Device according to claim 1, wherein a lateral face of said lower part of said stop element is cooperative with said means for positioning and clamping said first sheet blank and has a section matching the section of said means for positioning and clamping said first sheet blank.

6. Device according to claim 2, wherein said second control means comprises at least one double acting cylinder device comprising a body pivotally mounted on said support and a piston rod having a free end pivotally mounted on one of said connecting links at a point located in proximity to the articulation between said one link and said ruler.

7. Device according to claim 1, comprising a support, means connecting said stop element to said support, means for protecting said stop element and mounted on a face of said support in confronting relation to said high energy density beam in said retracted substantially horizontal position of said stop element.

8. Device according to claim 7, wherein said protecting means comprise brick sections of refractory material.

9. Device according to claim 8, wherein said brick sections have a width exceeding the width of said high energy density beam reflected on said brick sections in the absence of said sheet blanks in said positioning and clamping means, said beam being arranged to focus onto said sheet blanks under welding conditions.

10. Device according to claim 9, wherein the width of said brick sections is between 50 and 70 mm.

11. Device according to claim 8, wherein said brick sections have an upper face in the shape of a basin.

12. Device according to claim 8, wherein said brick sections extend over a length at least equal to the length of said stop element.

* * * * *